May 9, 1933. W. J. ANDRES 1,908,397
BRAKE
Filed Sept. 15, 1928 2 Sheets-Sheet 1
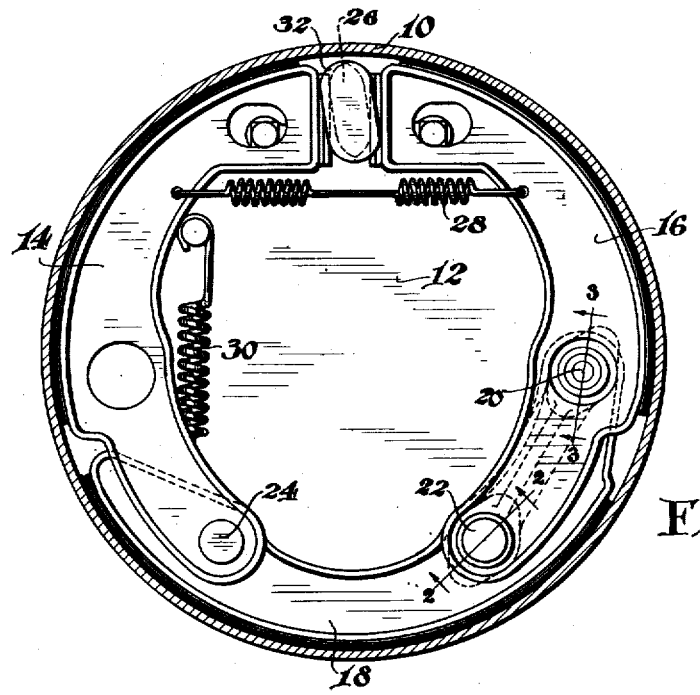
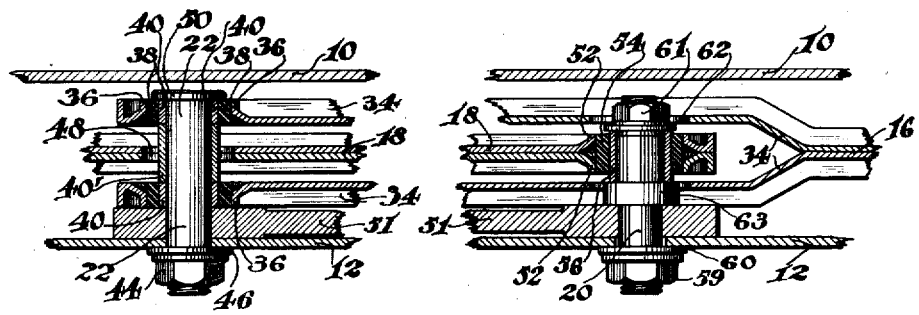
INVENTOR.
Wm. J. Andres
BY
ATTORNEY

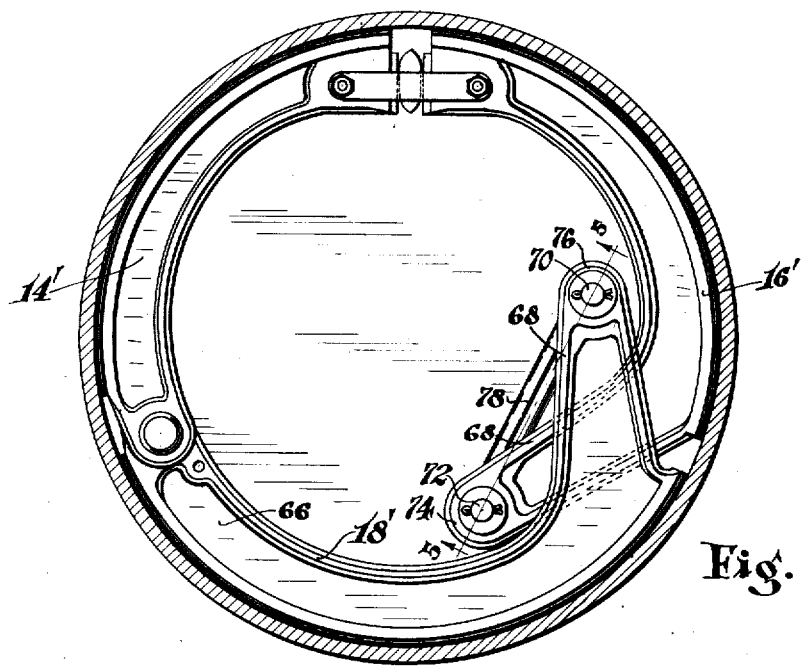

Patented May 9, 1933

1,908,397

UNITED STATES PATENT OFFICE

WILLIAM J. ANDRES, OF SOUTH BEND, INDIANA, ASSIGNOR TO BENDIX BRAKE COMPANY, OF SOUTH BEND, INDIANA, A CORPORATION OF ILLINOIS

BRAKE

Application filed September 15, 1928. Serial No. 306,225.

This invention relates to brakes and is illustrated as embodied in the brake shoe friction means of an internal expanding type of brake.

An object of the invention is to enhance the utility of the shoes normally employed in a conventional brake by a very slight change in their construction. A further object involves the provision of a novel combination of brake shoe and its torque-taking anchor, the latter usually attached to the brake backing plate.

In the retarding operation of the usual internal expanding type of servo brake the brake shoes pivot on anchors fixed to the backing plate, the retarding effect being obtained by the frictional resistance to motion developed between the lining attached to the shoes and the revolving drum. In order to obviate locking engagement and grabbing of the shoes with the drum, a resilient lining is necessarily employed, one that with applications of pressure upon the shoes will yield, and at the same time effect the necessary braking action without locking the drum.

It is to enhance this yielding effect of the lining, making possible a gradation of drum engagements between locking and no engagement that my invention is primarily designed. I propose to utilize the inherent resiliency of rubber or any suitable equivalent yielding material by making the connection between the anchor and the brake shoe a resilient one. By virtue of this construction the brake will respond evenly and surely to pressure on the service pedal, all grabbing or chattering being obviated.

Another inherent feature of my invention as embodied in the internal expanding type of brake, relates to its function as an auxiliary return spring, in that the particular resilient connection aids in the return of the shoe to its inoperative position. A further but nevertheless important feature of the invention is to utilize yielding means between the shoes and anchors to obviate the otherwise necessary lubrication between these relatively movable parts.

A further object of my invention relates to the provision of such a connection between the shoe and its anchor as will compensate for errors in adjustment of the shoe with respect to the drum. Should the anchor pin be improperly placed so as to prevent the shoe from completely seating upon the drum, the yieldable connection between these parts will automatically compensate for this error, permitting the rim of the shoe with its lining to center and seat itself in full drum contact position.

In one very desirable arrangement I utilize a standard type of three-shoe brake, modifying the same only to a limited extent in adapting my invention thereto. This may be done by slightly enlarging the anchor pin holes normally employed in the overlapping ends of the secondary and auxiliary shoes of the three-shoe servo or self-energizing brake. Within each hole in the furcations of the auxiliary shoe I prefer to insert a combined metal and rubber bushing and subsequently bond the bushing to the shoe; a single bushing may be similarly employed in the end of the secondary shoe. With the auxiliary shoe construction I prefer to use a third metal bushing functioning as a spacer between metal and rubber bushings. The inner ends of the anchors may be headed to contact with the bushings tending to hold the same immovable relative to the anchor pin.

The above and other objects and features of the invention, including various novel combinations of parts and desirable particular constructions, will be apparent from the following description of the illustrated embodiments shown in the accompanying drawings, in which:

Figure 1 is a vertical section through a three-shoe self-energizing type of brake embodying the invention, the section being taken just inside the head of the brake drum showing the brake shoes in side elevation;

Figure 2 is a section taken on the line 2—2 of Figure 1 indicating my invention as embodied in the connection between the auxiliary shoe and its anchor pin;

Figure 3 is a section taken on the line 3—3 of Figure 1 indicating a connection between the secondary shoe and its anchor;

Figure 4 is a view similar to Figure 1 indicating the invention as embodied in a different type of self-energizing brake;

Figure 5 is a section taken on the line 5—5 of Figure 4; and

Figures 6 and 7 are views similar to Figures 2 and 3 indicating slightly modified forms of rubber bushings.

As disclosed in Figure 1, the self-energizing brake with which my invention is best adapted to be used may include a rotatable drum 10, at the open side of which is a stationary support such as a backing plate 12. Within the drum are arranged three brake shoes 14, 16 and 18, secondary shoe 18 being anchored on pivot pin 20, auxiliary shoe 16 being anchored on pivot pin 22 and primary shoe 14 being connected to the secondary shoe by a floating pivot 24. The brake is applied by means such as a double cam 26 against the resistance of a return spring 28, shoe 18 being applied by shoe 14 against resistance of an auxiliary return spring 30. Cam 26 may have an end flange 32 confining the shoe ends laterally.

The present invention relates to novel means provided for pivotally mounting the brake-retarding means upon a thrust or torque-taking anchor and in the embodiments illustrated in Figures 1, 2 and 3 the secondary and auxiliary shoes are disclosed provided with my novel rubber bushings co-acting with their rigid anchor pins.

As disclosed in Figure 2, each of the furcations 34 of the forked auxiliary shoe 16 may be provided at their ends with outturned substantially cylindrical flanges 36 adapted to house a washer-like rubber bushing 38 and each bushing may be provided with spaced metal sleeves 40 within the same. If desired, the rubber bushings may be truly cylindrical in outline or they may be molded to exactly fit the opening, as clearly disclosed in Figures 6 and 7.

I prefer to permanently bond the rubber bushings to the shoe and each metal sleeve 40 to each rubber bushing by vulcanization. However, these may have a driving or tight frictional fit. An anchor pin 22 secured to backing plate 12 by suitable locking means such as a nut 44 supplemented by a washer 46 is adapted to pass through the metal sleeves 40 of the auxiliary shoe and through the slot 48 in the secondary shoe 18 and may be provided with an integral head 50 to contact with bushing 38 and metal sleeve 40. A sleeve 40' surrounding the pin 22 may be interposed as a spacer between the sleeves 40, and a reinforcing plate 51 suitably attached to the backing plate may function as a lateral support for the shoe 16, the bushing 38 and metal sleeves 40 contacting with the same.

The secondary shoe 18 may, as disclosed in Figure 3, be provided with out-turned substantially cylindrical flanges 52 similar to flanges 36 and may, by virtue of the back-to-back arrangement of the webs, house but a single rubber washer or bushing 54 with its metal sleeve 56. The rubber of this bushing may completely fill the V-shaped opening between the flanges in a manner disclosed in Figure 7.

An anchor pin 20 secured to the backing plate by a nut 59 supplemented by a washer 60, may pass through the metal sleeve 56 and an opening in shoe 16 and may be provided with a nut 61 and washer 62 to maintain the metal sleeve in engagement with shoulder 63 on the pin and render the same substantially immovable upon the anchor pin for a purpose to be described hereinafter. The reinforcing plate 51 may be arranged to contact with and act as a support for the enlarged end 63 of the anchor pin 20. As with the arrangement disclosed in Figure 2 the bushing, shoe and sleeve may be integrally united or bonded, or they may have a driving fit as described.

In assembling the shoes, the spacer 40' is first held in position in the slot 48 in the secondary shoe which is then slipped between the furcations of the forked end of the auxiliary shoe. The anchor pins may now be slipped in place and tightened up snugly to retain the metal sleeves comparatively immovable with respect to the pins.

As a modification of the invention I may, as disclosed in Figures 4 and 5, adapt the same to a single web shoe structure. Shoes 14', 16' and 18' may be of cast construction and provided each with a single web portion 66 reinforced at its inner edge and at its anchored ends by a rounded enlargement 68. The anchored ends of the shoes 16' and 18' are preferably projected inwardly toward the center of the backing plate at 70 and 72, 70 being slightly offset from the end of the web to clear the end 72.

At the extreme ends of the shoes 16' and 18' the enlargements 68 preferably merge into tubular shaped bosses 74 and 76 extending respectively inwardly and outwardly, as disclosed in Figure 5, to lie in the same plane and to abut against a reinforcing plate 78 secured to the backing plate.

The housings or bosses 74 and 76 are preferably each provided with a bushing 80 of any suitable yieldable material such as rubber, each bushing having a rigid anchor pin 82 passing therethrough, reduced at 84 to provide a shoulder adapted to abut against the plate 78. The pins are rigidly secured to the backing plate as by nuts 86 and may be provided each with an integral head 88 to contact the end of the housing and yieldable material. I prefer to have the material of the boss, bushing and pin of each shoe bonded together to form a one-piece integral structure.

In operation of the modification disclosed in Figure 1, application of pressure to the service pedal or other brake operating element transmits a like pressure to the primary and auxiliary brake shoes 14 and 16, forcing the same into drum contact, the auxiliary shoe anchoring on pin 22 and the primary shoe pivoting on articulating pin 24. The servo action of the primary shoe subsequently forces secondary shoe into drum contact anchoring on pin 20.

By virtue of the bond between the shoes and their bushing parts and the clamping action of the nut 61 and pin head 50 with these parts to hold the same immovable, the rubber is subjected to a twisting or torsional stress when the shoes are forced into drum engagement. Upon removal of the braking pressure the distorted rubber immediately returns the shoes to their former inoperative position, thereby supplementing the action of the return springs.

The rubber or other yieldable bushing also acts as a buffer or cushion between the shoe and rigid anchor pin supplementing the yielding action of the more or less pliable lining material to give a gradual smooth application of the brakes with the resultant uniform deceleration of the car and obviating the objectionable grabbing or locking of the wheels. The action of the modification disclosed in Figure 4 is substantially the same as disclosed in Figure 1 and in both structures the usual lubrication of the movable brake shoes may be dispensed with.

While illustrative embodiments of the invention have been described in detail, it is not my intention to limit its scope to those particular embodiments or otherwise than by the terms of the appended claims.

I claim:

1. A brake comprising, in combination, a retarding element, an anchor therefor, one of said parts provided with yieldable element rigidly secured thereto.

2. A brake comprising a retarding element and an anchor therefor, together with yieldable means securing these parts together.

3. A brake comprising a retarding element and an anchor therefor, at least one of said parts provided with yieldable bushing permanently bonded thereto.

4. A brake comprising, in combination, brake elements in overlapping relation, an anchoring element for each of said aforementioned brake elements and yieldable means associated with at least one of said elements and interposed between said element and its anchor.

5. A brake comprising, in combination, overlapping brake shoes, anchoring means passing through openings in the overlapping portions of said shoes and yieldable means interposed between said anchoring means and said openings.

6. A brake shoe provided with a combined metal and rubber bushing in one end thereof.

7. A brake comprising a retarding element, a rubber bushing within one end of said element, said bushing housing an anchor pin passing therethrough, all parts being integrally connected one with another.

8. A brake comprising, in combination, a retarding element, a yieldable bushing within one end of said element, said bushing housing an anchor pin passing therethrough, the bushing being integrally connected to the pin.

9. A brake retarding element comprising an anchor pin integrally attached to one end thereof, said anchor pin so connected with the body portion of the element as to be capable of relative movement therewith.

10. A brake shoe comprising an anchor pin integrally and yieldably connected therewith.

11. The combination with a brake having a shoe provided with a forked end having openings therein and a second shoe having one end thereof straddled by said forked end and provided with an opening in line with the aforementioned opening, of an anchor pin passing through said openings in the shoes and yieldingly connected to one of the said shoes.

12. The combination with a brake having a shoe provided with a forked end having openings therein and a second shoe having one end thereof straddled by said forked end and provided with an opening in line with the aforementioned opening, of an anchor pin passing through said openings in the shoes and yieldingly connected to one of the said shoes by a rubber bushing housed within the openings in the shoe.

13. In a brake, a brake shoe having a rubber washer, a metal sleeve therein and a bond pin within the sleeve, the shoe, washer and sleeve being bonded together.

14. A brake comprising a shoe having a flanged opening therein, a rubber bushing bonded to the shoe and fitting within the opening, together with a metal sleeve fitting within said bushing.

15. A braking element provided with a boss at one end, a resilient bushing housed within said boss and a rigid anchor pin housed within said bushing, said parts being integrally connected one to the other.

16. A brake comprising, in combination, a shoe provided with a cylindrical boss at one end thereof, said boss having integrally formed therewith a rubber bushing, which bushing is provided with an integrally attached projecting steel pin.

17. A brake comprising a drum, a plurality of shoes having separate anchors, and a resilient member interposed between each shoe and its anchor to permit circumferential movement thereof relative to the drum.

In testimony whereof, I have hereunto signed my name.

WILLIAM J. ANDRES.

CERTIFICATE OF CORRECTION.

Patent No. 1,908,397.  May 9, 1933.

WILLIAM J. ANDRES.

It is hereby certified that error appears in the printed specification of the above numbered patent requiring correction as follows: Page 3, line 74, claim 5, after "and" insert "one of"; and that the said Letters Patent should be read with this correction therein that the same may conform to the record of the case in the Patent Office.

Signed and sealed this 8th day of August, A. D. 1933.

(Seal)

M. J. Moore.
Acting Commissioner of Patents.

end thereof, said boss having integrally formed therewith a rubber bushing, which bushing is provided with an integrally attached projecting steel pin.

17. A brake comprising a drum, a plurality of shoes having separate anchors, and a resilient member interposed between each shoe and its anchor to permit circumferential movement thereof relative to the drum.

In testimony whereof, I have hereunto signed my name.

WILLIAM J. ANDRES.

CERTIFICATE OF CORRECTION.

Patent No. 1,908,397.      May 9, 1933.

WILLIAM J. ANDRES.

It is hereby certified that error appears in the printed specification of the above numbered patent requiring correction as follows: Page 3, line 74, claim 5, after "and" insert "one of"; and that the said Letters Patent should be read with this correction therein that the same may conform to the record of the case in the Patent Office.

Signed and sealed this 8th day of August, A. D. 1933.

(Seal)

M. J. Moore.
Acting Commissioner of Patents.

CERTIFICATE OF CORRECTION.

Patent No. 1,908,397. May 9, 1933.

WILLIAM J. ANDRES.

It is hereby certified that error appears in the printed specification of the above numbered patent requiring correction as follows: Page 3, line 74, claim 5, after "and" insert "one of"; and that the said Letters Patent should be read with this correction therein that the same may conform to the record of the case in the Patent Office.

Signed and sealed this 8th day of August, A. D. 1933.

(Seal)

M. J. Moore.
Acting Commissioner of Patents.